United States Patent
Cosman

Patent Number: 6,147,690
Date of Patent: Nov. 14, 2000

[54] PIXEL SHADING SYSTEM

[75] Inventor: Michael A. Cosman, South Jordan, Utah

[73] Assignee: Evans & Sutherland Computer Corp., Salt Lake City, Utah

[21] Appl. No.: 09/020,171

[22] Filed: Feb. 6, 1998

[51] Int. Cl.⁷ .................................................. G06T 11/40
[52] U.S. Cl. .......................................... 345/431; 345/426
[58] Field of Search .................................... 345/422, 431, 345/434, 443, 505, 502, 523, 191

[56] References Cited

U.S. PATENT DOCUMENTS

| | | | |
|---|---|---|---|
| 4,949,280 | 8/1990 | Littlefield | 364/518 |
| 5,818,456 | 10/1998 | Cosman et al. | 345/434 |
| 5,903,272 | 5/1999 | Otto | 345/421 |

OTHER PUBLICATIONS

S. Boinodiris, "Computer Graphics Using Multi–Echelon Processing Structures", IBM TDB Feb. 1981.

Proceedings of SIGGRAPH 93 in *Computer Graphics* Proceedings, Annual Conf. Series, 1993; "Reality Engine Graphics", Kurt Akeley; Silicon Graphics Computer Systems; pp. 109–116.

Proceedings of SIGGRAPH 94 in *Computer Graphics* Proceedings, Annual Conf. Series, 1994: "Hardware Accelerated Rendering of CSG and Transparency", Michael Kelley, Kirk Gould, Brent Pease, Stephanie Winner, Alex Yen; Apple Computer, Inc.; pp. 177–184.

*Primary Examiner*—Mark Zimmerman
*Assistant Examiner*—Lance W. Sealey
*Attorney, Agent, or Firm*—Thorpe, North & Western, LLP

[57] ABSTRACT

A method and an apparatus for improved pixel shading. The method of the present invention is based upon the notion of allowing multiple polygons to contribute to the net transmittance effect of a single pixel. This is accomplished by providing a new multi-sample data structure which can store visual attributes for each polygon, sorting all the transparent polygons in a front-to-back arrangement, processing the transparent polygon records and then the opaque polygon records by accumulating the net effect of the transmittance of all polygons being sampled in a pixel, and applying the color attributes to the net effect of transmittance, thereby decoupling color from the calculations for determining transmittance.

25 Claims, 4 Drawing Sheets

PIXEL SHADING SYSTEM

BACKGROUND

1. The Field of the Invention

The present invention relates generally to computing pixel shades in a computer graphics system. More specifically, the present invention provides undiminished image quality for scene details behind transparent polygons by implementing a multi-sample data structure to thereby derive the final pixel shade.

2. The State of the Art

The state of the art in rendering realistic appearing objects on a computer display is complicated by the types of objects which can be rendered. For example, transparent (meaning partially transparent) objects make the task of determining the shading of a pixel more complicated. This is because all of the partially visible objects contribute to the final determination of how the pixel will appear in terms of color, intensity, etc.

Multi-sampling is a method for providing a crude type of pixel transparency effect. More specifically, it is the process for computing polygon surface values at several locations within a single pixel, and then combining these values according to predefined rules which account for the color, coverage, range and opacity of the different surfaces which occupy the pixel. The polygon surface values include selectable attributes which can be displayed in a pixel. These polygon surface values are hereinafter also referred to as samples, where samples are computed at several different places within a single pixel. Each sample can belong to a different polygon surface. Therefore, a computer graphics system must be able to handle, within each pixel, as many different polygons as there are samples.

Multi-sampling is a method which is typically employed to improve the appearance of polygon edges. By enabling polygons to only partially cover pixels, multiple objects can all contribute to the final pixel shading, as opposed to a previous "all or nothing" approach in which each pixel can have only one polygon "claim" it and thus display the attributes or values of a single polygon.

When using the "all or nothing" approach, the polygon which typically claimed a pixel of interest was the "closest" polygon. It was thus assumed that the "closest" polygon was completely obscuring all other polygons which were farther away and assumed to be covered by the "closest" polygon. However, multi-sampling enables the "sharing" of a pixel, so that multiple polygons can contribute to a pixels displayable attributes.

Another important concept to understand before introducing the present invention is that of a sample mask. A sample mask is a binary representation of all of the samples within a single pixel. One bit is assigned to each sample within a pixel. The bit indicates whether that sample is currently occupied by a polygon. In effect, the sample mask is a two-dimensional schematic representation of the way in which a polygon covers a pixel. State of the art multi-sample systems simultaneously employ different sample masks. For example, one type of mask that is associated with a pixel can record the cumulative coverage of that pixel by all prior polygons. Another type of sample mask is associated with a current polygon being rendered. The mask indicates which samples are to be associated with or claimed by the polygon.

Sample masks are also used to control polygon operations. For example, boolean operations on the masks are the means by which new polygons are merged into a pixel, and also determine how the polygons interact with each other. Accordingly, as each new polygon is rendered into a pixel, the system uses all of the masks associated with the prior polygons to determine if overlap exists within the pixel. The multi-sampling system can then use range or rendering order to decide which samples need to be re-assigned to the new polygon, or deleted from the new polygon.

As final pixel shading of pixels is computed, the color of the pixel is obviously an essential component of that calculation. The color of a pixel is computed from all of its samples by summing the color values from each, and then normalizing for the number of samples. Because there is only one color at each sample (which color comes from the polygon which "won" or can "claim" the sample), the summation is generally straightforward and economical in terms of computation resources and time.

State of the art multi-sample approaches to pixel rendering are found to be particularly relevant for graphics systems which must process scenes in arbitrary, as opposed to strict front-to-back order. However, these Z-buffer or R-buffer systems do not arrive at a correct final image until all of the polygons have been rendered. Therefore, they must store information regarding all of the polygons that affect a pixel. The Z-buffer and R-buffer processes are therefore inefficient.

It should now be apparent that the state of the art methods of multi-sampling can be used to provide a type of transparency effect. If a polygon is transparent, its degree of transparency can be approximated by disabling a portion of the pixel samples it might otherwise claim. For example, if a first polygon is 67% transparent (and thus 33% opaque), then 67% of the pixel samples are first disabled, thereby leaving a pattern of "holes" in the sample mask of the first polygon. The samples that remain associated with the first polygon are then treated as if they were fully opaque. The disabled samples can then be claimed by other polygons which are subsequently rendered and which lie beyond the first polygon. These other polygons will then associate their color and other attributes with those remaining samples. These other polygons will thus partially show through the sample mask of the first polygon, thus completing the illusion of transparency.

The process described above is commonly referred to as "screen-door" transparency. The number of transparency levels available is determined by the number of samples within a pixel. For example, if eight samples are provided, transparency is quantized to eight levels. If the number of samples within a pixel is modestly large, useful transparency effects are achievable.

There are some drawbacks associated with multisampling methods. For example, it should be apparent that partially transparent polygons have fewer pixel samples available for polygon edge antialiasing. The result is that the edges of partially transparent polygons are rendered with lower edge quality than opaque polygons. The problem is actually worse than the diminished sample count would suggest, because in general the holes in the sample mask associated with each transparency level can not be uniformly distributed across the pixel. Furthermore, the method of screen-door transparency seriously degrades the image quality of scene details that lie behind a transparent polygon, because polygon edge quality is related to the number of samples within a pixel.

For example, a transparent polygon disables some of these samples by claiming them in proportion to its level of opacity. Opaque scene details behind a transparent polygon have fewer samples available to smooth and antialias their edges. Consequently, small or thin scene details that otherwise would behave acceptably will break up, segment, scintillate and generally misbehave when rendered behind transparent polygons. Edges will thus become progressively more jagged as the remaining number of samples decreases.

Another drawback of state of the art multi-sampling methods is that "screen-door" approaches can not properly represent the visual effect of several overlaid transparent polygons. For example, if two polygons that are each 50% transparent are placed on top of each other, the back or farther polygon will not show up at all because its screen-door holes line up with the holes in the front or closest polygon, and its remaining samples are blocked by the surviving samples of the front polygon.

One method of overcoming this problem would be to provide two different screen-door patterns for 50% transparency situations, and ensuring that overlapped polygons are assigned different versions of 50% transparency masks. Unfortunately, however, even then the combined effect is not correct. The situation becomes worse for arbitrary combinations of different transparency levels, and the problem becomes completely intractable when considering three or more overlaid transparent polygons.

Accordingly, it would be an advantage over the state of the art to provide a method and apparatus for combining multiple combinations of transparencies that will result in accurate pixel rendering, and improved detail.

OBJECTS AND SUMMARY OF THE INVENTION

It is an object of the present invention to provide an improved method and apparatus for pixel rendering which includes at least one partially transparent and one opaque renderable objects.

It is another object to provide an improved method and apparatus for pixel rendering which overcomes drawbacks which are presently inherent to multi-sampling.

It is another object to provide an improved method and apparatus for pixel rendering which overcomes the problem of rendering lower quality transparent polygon edges in comparison to opaque polygon edges in multi-sampling.

It is another object to provide an improved method and apparatus for pixel rendering which overcomes screen-door mask overlay problems when rendering transparent objects.

It is another object when rendering polygons to provide undiminished image quality for scene details which are behind transparent polygons.

It is another object to provide proper concatenation of multiple overlaid transparent polygon surfaces.

It is another object to provide a more robust multi-sample data structure which is processed in a fundamentally different way from state of the art multi-sampling methods to achieve a final pixel shade.

It is another object to provide this improved multisampling method and apparatus which is capable of pixel rendering in real-time image rendering hardware.

It is another object to compute transparency effects with order-independent multi-sampling.

It is another object of the present invention to decouple the calculation of color of the pixel from the calculation of the net effect of transmittance.

It is another object to provide a continuously updatable determination of the net effect of transmittance.

The present invention is realized in a method and an apparatus for improved pixel shading. The method of the present invention is based upon the notion of allowing multiple polygons to contribute to the transmittance of a single pixel. This is accomplished by the more specific steps of 1) providing a new multi-sample data structure which can store visual attributes for each polygon, 2) sorting all the transparent polygons in a front-to-back arrangement, but not the opaque polygons, 3) processing the transparent polygon records and then the opaque polygon records by accumulating the net effect of the transmittance of all polygons being sampled in a pixel, and 4) applying the color attributes to the net effect of transmittance.

The method of the present invention is also directed to the new specific operations which occur during the processing of the transparent and the opaque polygon records in this new pixel shading system. The method includes the steps of 1) clearing registers so that no polygon information is present, 2) inputting identical polygon transmittance data to a plurality of sample processors which are equal in number to the number of pixel samples, 2) inputting polygon sample mask bits to corresponding sample processors, 3) summing the output of all the sample processors, 4) multiplying each color-opacity by its sample processor sum, and 5) adding each polygon color-sum product to the accumulating pixel shade.

In a first aspect of the present invention, a new pixel shading system is provided using a combination of sample processors which are coupled to a sample processor output summation network whose output is provided to three shade multiply-accumulators. The shade multiply-accumulators combine the accumulated transmittance effects with color information which then results in a single output pixel having the correct shade and coloring.

In a second aspect, a new sample processor is provided which enables evaluation of the net transmittance effect of multiple polygons at multiple samples within a single pixel.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The preferred embodiment of the present invention provides an improved multi-sampling method and apparatus which provides undiminished image quality for scene details behind transparent polygons, and proper concatenation of multiple overlaid transparent surfaces. This is accomplished by abandoning the well known screen-door approach.

In a first aspect of the preferred embodiment, it is important to know that the multi-sample data that drives the rendering system is organized in a different manner than in the state of the art. Instead of there being a single "winning" polygon which claims each sample in a pixel in state of the art methodology, multiple winning polygons are now allowed. The implications of this new data structure are demonstrably proven when examining rendered pixels.

Under the rules of determining pixel "ownership," a transparent polygon wins a sample if it is not located behind an opaque polygon that also wants the sample. Therefore, there can be multiple transparent polygon winners for each sample, but only one winning opaque polygon, which is therefore the farthest renderable polygon for that particular sample.

Because there can be multiple winners for a single sample, a multi-sample data structure must be provided for storing, for each polygon, its visual attributes (such as color, transmittance, etc.) and the samples that the polygon wants.

Apart from a new data structure, the order of processing is also critical to the present invention. In order to calculate the proper final shading effect for each pixel, the transparent polygons within a pixel need to be processed in a front-to-back order.

An important observation at this point, however, is that this order of processing does not require scene polygons to also be rendered front-to-back. The process only requires a means for sorting the polygons (more accurately the polygon records) stored within each pixel. Therefore, subsequent references to processing or rendering order only concern the sequence that polygons records are sorted within each pixel.

The preferred embodiment of the present invention is able to achieve real-time pixel rendering results by taking advantage of understanding the underlying processes. One novel method of speeding up pixel shading calculations is to sort the transparent polygon records into a single front-to-back order that applies to all the samples within the pixel of interest. It is useful to note that within a pixel, the opaque polygons can be processed in any order, because only one of them can exist at each sample (the first or nearest opaque polygon). However, each opaque polygon must be processed after any transparent polygons that overlap it. The preferred method to accomplish this is to process all of the opaque polygon records last.

A system which implements the method and apparatus of the presently preferred embodiment includes a data storage structure for multi-sample data organized and sorted as above. The data storage structure includes storage space for the color and transparency of each polygon, and its corresponding sample mask.

When referring to transparency, it is important to realize that this is really transmittance. Therefore a value of 0.0 means the polygon is fully opaque, and a value of 1.0 means the polygon is fully transmissive or transparent. Transmittance is represented by a value between 0.0 and 1.0, instead of a small integer between 0 and the number of samples per pixel. This enables using a continuous choice of transmittance values for modeling individual polygons, and also allows transmittance to vary smoothly and continuously across the surface of a single polygon. Note that opacity is just a transmittance value of 0.0.

Color information typically consists of red, green and blue (RGB) values. Each color value is pre-multiplied by the polygon opacity value to thereby simplify later calculations. Note also that none of the polygon's sample masks have been altered to account for transparency, but instead retain their full complement of samples. Accordingly, there is a polygon record for each polygon that retains any samples within a pixel.

Figure 1:
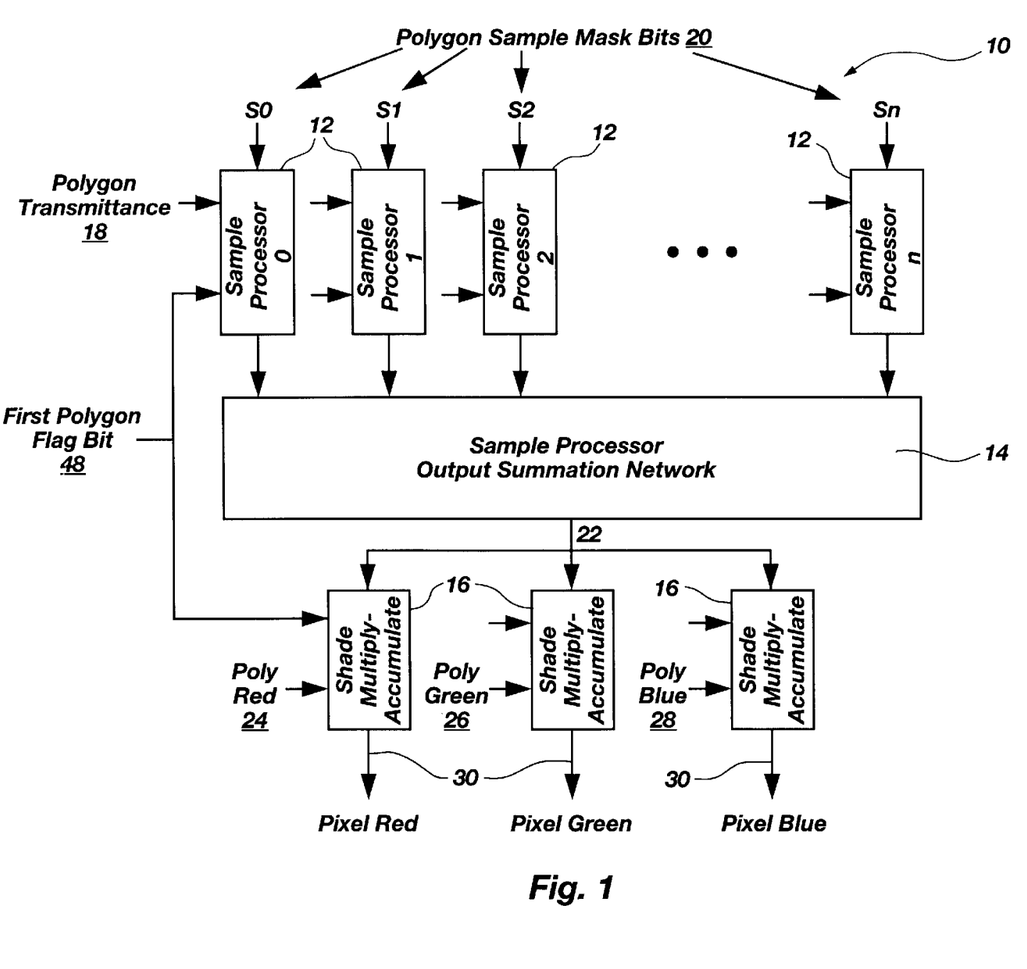
FIG. 1 is a block diagram of the presently preferred embodiment of the pixel shading system as constructed in accordance with the principles of the present invention, and including all input and output signals to and from the system.

FIG. 1 is a block diagram showing how the polygon records or polygon data records are processed by the pixel shading system 10 of the present invention. The figure shows a plurality of identical sample processors 12 (one for each sample), a summation network 14, and a trio of shade multiply-accumulators 16.

The circuit being described is a hardware implementation of the method of the present invention. However, it should be realized that the same functionality of the circuit is also reproducible in software. An example of C computer programming code which implements the present invention is included as Appendix A at the end of this document. It should be noted that the software implementation is a relatively small code segment. Nevertheless, in light of speed concerns in a real-time imaging system, the preferred embodiment shows a hardware solution for obtaining improved pixel shading.

The system 10 is first sent a first-polygon flag bit 48 which initializes a particular internal data storage register at the beginning of each new pixel being processed. In this way, all of the polygons which are adding to a residual transmittance effect are only affecting the current pixel in which the polygons are present.

The first-polygon flag bit 48 is sent to each of the plurality of identical sample processors 12. It should be observed that the number of identical sample processors 12 is shown as being s(n), where n is the maximum number of samples which are taken from each pixel. Processing more samples results in more accurate pixel shading. However, there are practical limitations to consider such as a desired frame rate, as well as the limits of resolution of a computer display. Consequently, a typical minimum number of samples which are taken is 8, where 16 samples are sufficient to obtain good precision and yet achieve the required real-time speeds.

After the identical sample processors 12 are initialized, they receive identical input in the form of polygon transmittance 18. The unique data received by the sample processors 12 is in the form of polygon sample mask bits 20. After processing, the sample processor output summation network 14 receives the output of each sample processor 12. The same sample processor summation signal 22 is then sent to the shade multiply-accumulators 16, where the signal 22 is multiplied by a polygon color component 24, 26 or 28 (either red, green or blue). Three shade multiply-accumulators 16 are required to obtain the three colors, and each polygon color-sum product is added to the accumulating shade of the pixel in an internal process. More detail about the shade multiply-accumulators will be provided in FIG. 3.

Figure 2:
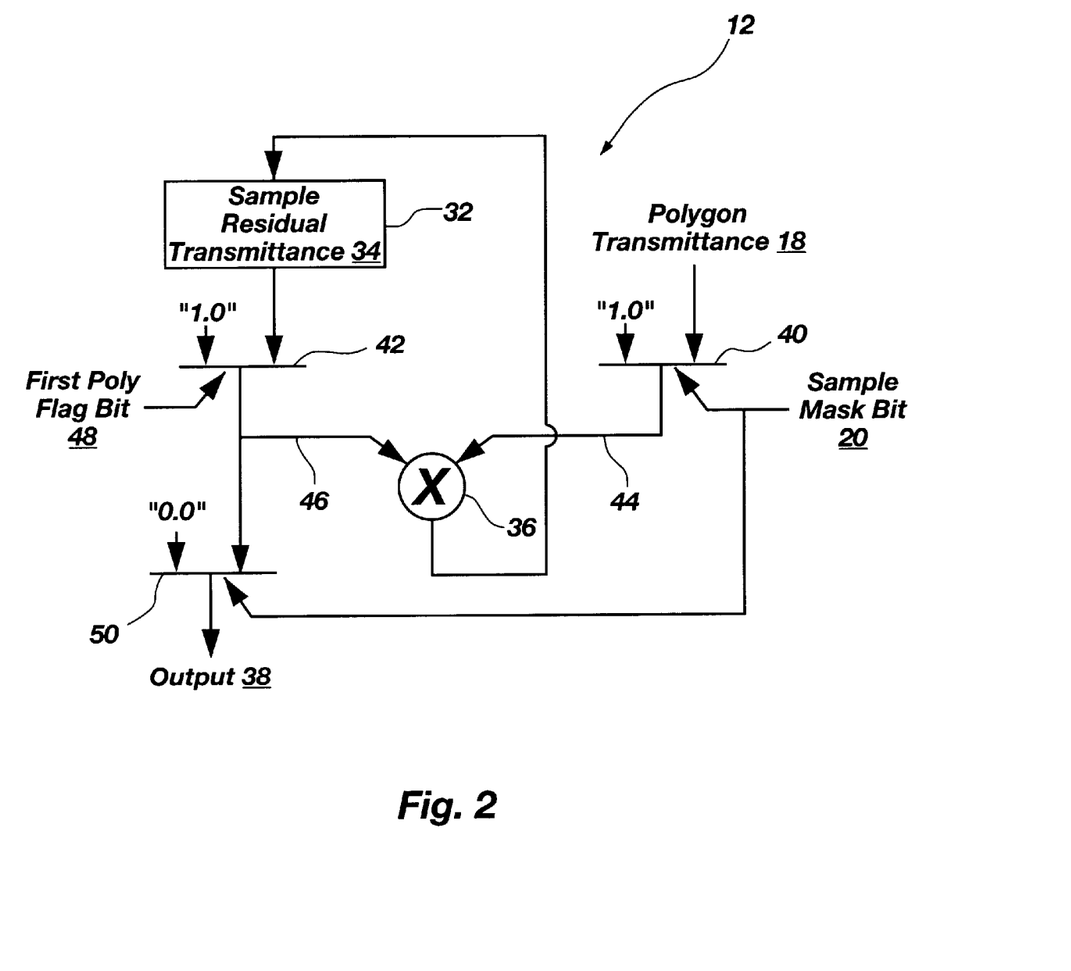
FIG. 2 is a block diagram showing the internal functionality of the components used in a single sample processor of FIG. 1.

FIG. 2 shows a block diagram for the inner workings of the sample processor 12. The elements of the sample processor 12 shown in FIG. 2 include a register 32 to hold a residual sample transmittance value 34, a multiplier 36 to modify this value 34 as each new polygon is processed, and logic to control these processes and select the proper output 38. The input signals include the current polygon transmittance value 18 and the current polygon sample mask bit 20 associated with this particular sample processor, as well as the first-polygon flag bit 48.

Operation of the sample processor 12 is as follows. As each polygon is processed, its transmittance value appears at a first multiplexor (selector switch) 40. If the sample mask bit 20 is set, the polygon transmittance value 18 is passed to one of the multiplier 36 inputs. If the sample mask bit 20 is not set, a value of 1.0 is sent to the multiplier 36. Passing the value of 1.0 results in no change to the residual sample transmittance value 32.

This residual sample transmittance value 34 which is the output of the multiplier 36, will be used for subsequent polygons, and will thus attenuate their contribution for this sample. If this polygon doesn't exist at this sample, then the value of 1.0 which is sent to the multiplier 36 ensures that subsequent polygons are not affected.

The other input to the multiplier 36 is the residual sample transmittance value 34 stored in the residual transmittance register 32, or a value of 1.0 if this is the first polygon being processed. The selection of which value is input to the multiplier 36 is made at a second multiplexor 42. The selection is made a function of the first-polygon flag bit 48. If the first-polygon flag bit 48 is set, the multiplexor 42 passes a value of 1.0 to the multiplier 36. Otherwise, the residual transmittance register 32 passes its accumulated residual sample transmittance value 34 for that sample, A value of 1.0 from the multiplexor 42 indicates that there is no prior polygon in front of what must be the first polygon. After the first polygon has been processed, the residual transmittance register 32 will contain either the first polygon transmittance value 18 (if the first polygon exists in this sample), or a value of 1.0.

As each subsequent polygon is processed, the residual sample transmittance value 34 in the residual transmittance register 32 changes (decreases) to account for the transmittance of polygons that existed at this sample. Polygons that do not exist at this sample cause the existing residual transmittance value 34 to be multiplied by 1.0, and thus to be reloaded into the register 32 unmodified.

The output of multiplexor 42 is sent to the multiplier 36 and to an output multiplexor 50. The output multiplexor 50 also receives as an input a null value. The output multiplexor 50 passes the residual sample transmittance value 34 if the sample mask bit 20 is set. Otherwise, the output multiplexor 50 passes 0.0.

It should be apparent that if the polygon being processed does not exist at the present sample, the output values 38 of the multiplexors 50 is 0.0 if the polygon being processed does not exist at this sample, indicating that no incremental transmissiveness should be applied to this sample for this particular polygon. For consistency, the output value 46 is "don't care" and the output value 44 is 1.0. In contrast, if the polygon exists at this sample, then the output value 38 is the residual sample transmittance value 34 for all prior polygons that also claim this sample.

Referring back to FIG. 1, the sample processor output summation network 14 sums all of the composite transmittance values output by the sample processors 12. The resulting single value represents the current polygon's transmittance value contribution after accounting for the effects of any overlaid transparent polygons. This value is, in effect, the equivalent residual pixel area of the polygon. Importantly, it is a result of sample-level operations, not just pixel-level operations. Therefore, it properly accounts for all sub-pixel edge interactions. Furthermore, it has continuous resolution, not just the few levels that would normally be available in a screen-door approach.

Another significant element of this improved pixel shading process is that the output value 22 is colorless. The colors of the polygons do not factor into this process until the last step in the process for each polygon. In other words, color is added in the multiply-accumulators 16 by the multiplier 56. All previous steps are to obtain the transmittance value of a particular polygon. Consequently, the size of the system is significantly reduced because color values are not factored into the pixel shading until the net transmittance effect is calculated completely for a polygon.

The equivalent residual pixel area (shown as output 22) is multiplied by the polygon color-opacity values 24, 26, 28 to obtain the red, green and blue incremental additions which are then added to the accumulating pixel shade.

It should be observed that the shade multiply-accumulators 24, 26, 28 which receive the red, green and blue incremental additions must be initialized to 0.0 at the beginning of each pixel. When all polygons within the pixel have been processed, the red, green and blue values 30 at the outputs of the accumulators 24, 26, 28 are the final display pixel colors.

Figure 3:
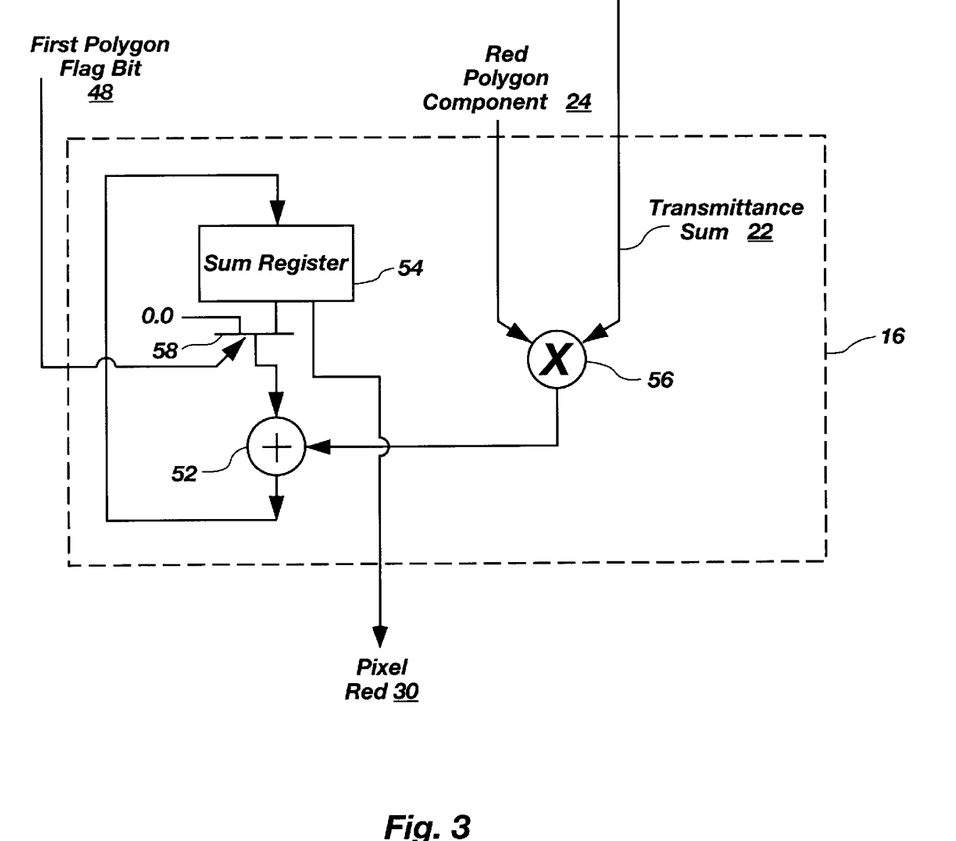
FIG. 3 is a schematic block diagram showing the internal processes of a shade multiply-accumulator.

FIG. 3 is provided to explicitly show the operations which take place within one of the accumulators 16. The accumulator 16 receives as inputs the first-polygon flag bit 48, and the transmittance sum 22. The first-polygon flag bit 48 has the effect of initializing a sum register 54 through an adder 52 by passing a 0.0 through switch 58. As transmittance sums 22 for each polygon in the pixel are generated by the circuit of FIG. 1, the sums 22 are received at multiplier 56. The multiplier 56 also receives as input the red polygon component 24 of the polygon being processed. It should be remembered that the red polygon component 24 is stored in the new data structure provided by the present invention.

The multiplier 56 transmits its product to the adder 52. The adder 52 in turn transmits its sum to the sum register 54. The sum register 54 thus accumulates the pixel shade for the particular pixel being processed. After all polygons which claim samples in the pixel are processed, the pixel red 30 output of the sum register 54 has the correct pixel shade to be rendered on the computer display.

Figure 4:
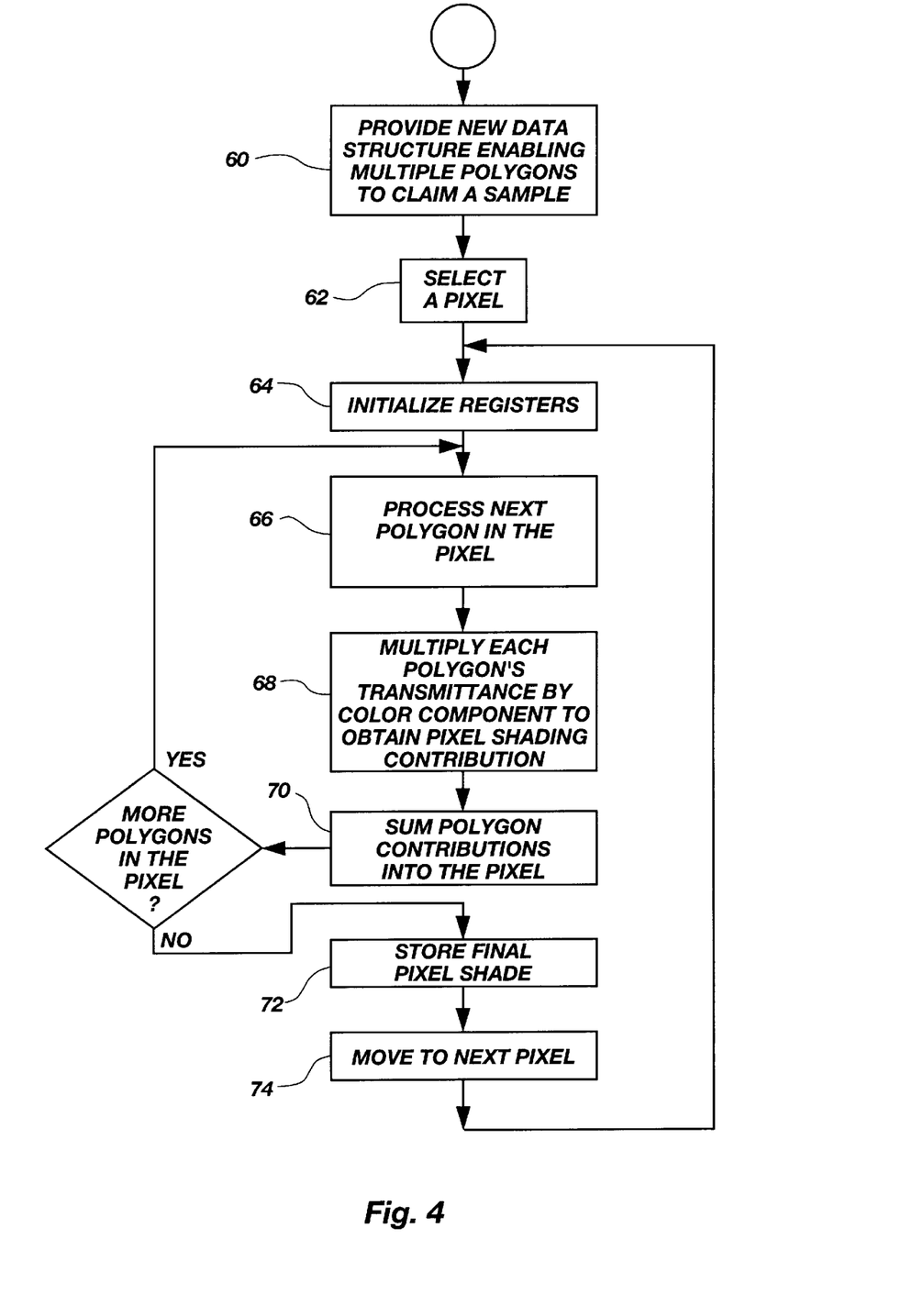
FIG. 4 is a flowchart of the internal processes within a sample processor.

FIG. 4 is provided for convenience as an outline of the method of the present invention. In the first step 60, the data structure is provided for storing the visual attributes for each polygon, transparent and opaque. In the second step 62, a pixel to be processed is selected. In the third step 64, cumulative registers within the circuits are all initialized (cleared) so as not to bring in any data from other pixels. In the fourth step 66, the next polygon which is present in the pixel is processed, regardless of whether the polygon is present in any particular sample. This is because a transparent polygon will claim some samples of a pixel, but not necessarily all. However, the circuitry of the present invention enables all samples to be processed simultaneously for the current polygon, so there is no waste of resources in making calculations when the current is not present in a particular sample because the processing occurs in parallel for all samples.

In the fifth step 68, each polygon's transmittance value is multiplied by its color components to obtain a pixel shading contribution for that particular polygon. Presently, three color components (red, green and blue) are multiplied by the same transmittance value. In the sixth step 70, the polygon color contribution is summed into the pixel. In the seventh step 71, it must be determined whether there are more polygons in the pixel. If there are more polygons, the flowchart branches back to the fourth step 66. Otherwise, after all of the polygons are processed, the resultant pixel shading value is the sum of all pixel shading values for every polygon in the pixel. In the eighth step 72, the pixel is stored in a display buffer. The ninth step 74 is to move to the third step 64 and to continuously repeat the process.

It is noted that the description of the preferred embodiment of the present invention above has been illustrated with its current hardware implementation. It should be realized that other circuit configurations can also be realized which can carry out the equivalent function. These other circuits should also be considered to be within the scope of the present invention.

It is helpful when implementing the preferred embodiment to know about one situation in which the sorting order short-cut provided by the present invention does not add to the objective of improved pixel shading. The situation arises because there is one case where the polygons can not actually be sorted in a front-to-back order. Specifically, this situation arises when two transparent polygons pierce each other, so that part of each polygon is in front of part of the other. When this occurs, the system of the preferred embodiment will render a jagged edge at the intersection of the polygons, rather than a smoothly antialiased edge. In contrast, intersection edges between opaque polygons, or an opaque polygon and a transparent polygon, will be rendered with full multi-sample edge quality of the present invention. However, it should also be realized that the occurrence of polygons piercing each other can be avoided, and thus does not have to be a problem.

Some important advantages of the present invention may not be immediately obvious from the description of the embodiments above. It is worth noting that the color calculations are kept out of the sample-level portion of the pixel shading system, thus greatly simplifying the process. Processing time now depends on the number of polygons in a pixel, and not the number of samples. The system is also scalable in that it can be sized for different numbers of samples per pixel. The circuitry used to implement this system is fast, small and efficient.

Regarding the different combinations of polygons which can be displayed, it is worth noting that correct visual results are produced for all opaque combinations of polygons, for all combinations of opaque/transmissive polygons, and for all combinations of transmissive polygons except where two transmissive polygons interpenetrate. However, the visual defect is subtle and minor.

Advantageously, the system enables proper interaction between overlaid transmissive polygons to thereby produce correct net transmittance effects. Furthermore, there is no scene degradation behind any combination of transmissive polygons.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for improved pixel shading using multi-sampling to thereby obtain more accurate pixel rendering, said method comprising the steps of:
   (1) providing a multi-sampling data structure capable of storing attributes for each transparent and opaque polygon in a pixel;
   (2) processing the transparent polygons in sorted order and the opaque polygons to thereby accumulate a net effect of transmittance of all the transparent polygons in the pixel if present; and
   (3) processing each opaque polygon after any transparent polygons that overlap the opaque polygon.

2. The method as defined in claim 1 wherein the step of providing a new multi-sampling data structure further comprises the step of enabling more than one polygon in the sample to affect transmittance thereof, wherein the new data structure includes sufficient memory space for storing for each polygon its visual attributes and the samples in which the polygon can appear.

3. The method as defined in claim 1 wherein the step of processing the polygons to thereby accumulate a net effect of transmittance further comprises the step of combining polygon transmittances in hardware for each sample.

4. The method as defined in claim 1 wherein the step of processing the polygons to thereby accumulate a net effect of transmittance further comprises the step of processing a plurality of samples from each pixel by receiving as input a polygon transmittance signal and a plurality of polygon sample mask bits, and for generating as an output signal a plurality of sample residual transmittance signals.

5. The method as defined in claim 4 wherein the method further comprises the step of receiving and summing the plurality of sample residual transmittance signals, and generating an output signal representing a pixel residual transmittance for each pixel.

6. The method as defined in claim 5 wherein the method further comprises the step of obtaining a pixel shade by multiplying the pixel residual transmittance of each pixel by a plurality of polygon color attributes.

7. The method as defined in claim 6 wherein the step of obtaining a pixel shade by applying the polygon color attributes to the net effect of transmittance further comprises using one multiply-accumulator for each color to be combined in the pixel.

8. The method as defined in claim 1 wherein the method further comprises the step of calculating the pixel transmissiveness at a sample level.

9. The method as defined in claim 1 wherein the method further comprises the step of waiting until the net effect of transmittance is determined for a pixel before applying color attributes.

10. The method as defined in claim 1 wherein the method further comprises the step of determining the net effect of transmittance as a function of a total number of polygons in a pixel, and not of a total number of samples in the pixel.

11. The method as defined in claim 1 wherein the method further comprises the step of obtaining correct pixel shading without scene degradation for pixels disposed behind any combination of transmissive polygons.

12. The method as defined in claim 1 wherein the method further comprises the step of including only a closest opaque polygon after determining the net transmittance effect.

13. The method as in claim 1, wherein the step of processing the transparent polygons further comprises allowing multiple winning transparent polygons for each pixel sub-sample.

14. A method for improved pixel shading using multi-sampling to thereby obtain more accurate pixel rendering said method comprising the steps of:
   (1) providing a multi-sampling data structure capable of storing attributes for each transparent and opaque polygon in a pixel;
   (2) processing the transparent and the opaque polygons to thereby accumulate a net effect of transmittance of all the transparent polygons in the pixel if present, and of all the opaque polygons in the pixel; and
   (3) obtaining correctly rendered results for all combinations of transmissive polygons except where at least two transmissive polygons interpenetrate.

15. A method for improved pixel shading using multi-sampling to thereby obtain more accurate pixel rendering of transparent and opaque polygons, said method comprising the steps of:
  (1) providing a new multi-sampling data structure capable of storing attributes for each polygon in a pixel;
  (2) sorting all the transparent polygons in the pixel in a front-to-back order; and
  (3) processing the polygons to thereby accumulate a net effect of transmittance of all the transparent polygons in the pixel if present, and of the opaque polygons in the pixel.

16. A method for processing pixel samples to thereby determine a transmittance effect by a polygon on a pixel, said method comprising the steps of:
  (1) receiving a polygon transmittance value if the polygon claims a sample;
  (2) storing the polygon transmittance value in a residual transmittance register when it is a first polygon being processed; and
  (3) accumulating a residual transmittance value in the residual transmittance register by multiplying each subsequent polygon transmittance value received as input, by a current residual transmittance value to attenuate each of the subsequent polygon transmittance values which is then transmitted as the output signal.

17. The method as defined in claim 16 wherein the method further comprises the step of repeating the process for all polygons which claim the sample to thereby determine the net effect of transmittance by all the polygons on the pixel.

18. A pixel shading system which includes utilizing a net effect of transmittance from one or more polygons to thereby render improved pixel shading, wherein the system calculates transmittance from a plurality of samples for each pixel, said system comprising:
  a means for processing a plurality of samples from each pixel by receiving as input a polygon transmittance signal and a plurality of polygon sample mask bits, and for generating as an output signal a plurality of sample residual transmittance signals;
  a means for receiving and summing the plurality of sample residual transmittance signals and for generating an output signal representing a pixel residual transmittance for each pixel;
  a means for obtaining a pixel shade by multiplying the pixel residual transmittance of each pixel by a plurality of polygon color attributes;
  a means for accumulating a plurality of pixels shades for each of the polygons which are present in the pixel; and
  wherein the means for processing a plurality of samples from each pixel further comprises a plurality of pixel sample processors, wherein each processor receives a unique polygon sample mask bit.

19. The pixel shading system as defined in claim 18 wherein the means for receiving and summing the plurality of sample residual transmittance signals further comprises a pixel sample processor output summation network.

20. The pixel shading system as defined in claim 18 wherein the means for obtaining a pixel shade further comprises:
  a first shade multiplier which multiplies the pixel residual transmittance by a red polygon color component of a current polygon;
  a second shade multiplier which multiples the pixel residual transmittance by a green polygon color component of the current polygon; and
  a third shade multiplier which multiples the pixel residual transmittance by a blue polygon color component of the current polygon.

21. The pixel shading system as defined in claim 18 wherein a total number of the plurality of pixel sample processors is equal to a total number of possible pixel samples.

22. The pixel shading system as defined in claim 18 wherein the system further comprises a means for clearing memory in the plurality of pixel sample processors.

23. The pixel shading system as defined in claim 18 wherein each of the plurality of pixel sample processors further comprises a processing means for receiving a first polygon transmittance value if the first polygon claims the sample, storing the first polygon transmittance value, and receiving subsequent polygon transmittance values for other polygons which claim the sample, and wherein each of the subsequent polygon transmittance values attenuates a residual transmittance value of the sample until all transparent polygons which claim the sample are processed.

24. The pixel shading system as defined in claim 23 wherein the processing means further comprises:
  a first switch which receives as inputs a current polygon transmittance value and an identity value, wherein the first switch passes the current polygon transmittance if a sample mask bit of a current polygon is present in a pixel sample;
  a sample residual transmittance register;
  a second switch which receives as inputs a sample residual transmittance signal from the sample residual transmittance register from a previous polygon in the pixel sample and an identity value, wherein the second switch passes the sample residual transmittance signal if the current polygon is not a first polygon evaluated in the sample;
  a multiplier which receives output from the first switch and the second switch, and which transmits an output signal to the sample residual transmittance register; and
  a third switch which receives as inputs the output from the second switch and a null value, said third switch passing the output of the second switch if the sample mask bit of the current polygon is present.

25. A method for improved pixel shading using sub-sampling to thereby obtain more accurate pixel rendering, said method comprising the steps of:
  (1) providing a multi-sampling data structure capable of storing attributes for each transparent and opaque polygon which affect a pixel and the pixel's associated sub-samples;
  (2) processing the transparent polygons in sorted order and the opaque polygons to thereby accumulate a net effect of transmittance of all the transparent polygons in the pixel, wherein each sub-sample is influenced by more than one polygon associated with that sub-sample.

* * * * *